United States Patent
Atherton et al.

(10) Patent No.: US 9,251,023 B2
(45) Date of Patent: Feb. 2, 2016

(54) IMPLEMENTING AUTOMATED MEMORY ADDRESS RECORDING IN CONSTRAINED RANDOM TEST GENERATION FOR VERIFICATION OF PROCESSOR HARDWARE DESIGNS

(71) Applicant: International Business Machines Corporation, Armonk, NY (US)

(72) Inventors: Craig T. Atherton, Burlington, VT (US); Avishai Fedida, Haifa (IL); Olaf K. Hendrickson, Rochester, MN (US); Oz Hershkovitz, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 510 days.

(21) Appl. No.: 13/789,177

(22) Filed: Mar. 7, 2013

(65) Prior Publication Data
US 2014/0257736 A1    Sep. 11, 2014

(51) Int. Cl.
*G06F 19/00*    (2011.01)
*G06F 11/263*    (2006.01)

(52) U.S. Cl.
CPC .................. *G06F 11/263* (2013.01)

(58) Field of Classification Search
CPC ............... G06F 17/5022; G06F 11/3688
USPC ............ 702/108, 117, 118, 182–185
See application file for complete search history.

(56) References Cited

U.S. PATENT DOCUMENTS

| | | | |
|---|---|---|---|
| 6,006,028 A | 12/1999 | Aharon et al. | |
| 6,327,559 B1 | 12/2001 | Wile | |
| 7,133,816 B2 | 11/2006 | Adir et al. | |
| 7,140,003 B2 | 11/2006 | Decker | |
| 7,370,296 B2 | 5/2008 | Koyfman et al. | |
| 2010/0218149 A1* | 8/2010 | Sasaki ................. | G06F 17/5022 716/106 |
| 2011/0099431 A1 | 4/2011 | Almog et al. | |
| 2012/0131386 A1 | 5/2012 | Fournier et al. | |
| 2012/0324208 A1 | 12/2012 | Alapati et al. | |

OTHER PUBLICATIONS

A. Aharon et al., "Verification of the IBM RISC System/6000 by a dynamic biased pseudo random test program generator," IBM Systems Journal vol. 30, No. 4, pp. 527-538, 1991.
E. Bin et al., "Using a constraint satisfaction formulation and solution techniques for random test program generation," IBM systems journal vol. 41 No. 3 pp. 386-402, 2002.
C. Krygowski et al., "Key advances in the presilicon functional verification of the IBM zEnterprise microprocessor and storage hierarchy," IBM Journal Research and Development, vol. 56, No. 1/2, pp. 13:1-13-16, 1991.

(Continued)

*Primary Examiner* — Edward Raymond
(74) *Attorney, Agent, or Firm* — Joan Pennington

(57) ABSTRACT

A method and apparatus are provided for implementing automated memory address recording in constrained random test generation for verification of processor hardware designs. A test generation program includes a built in feature to keep track of storage addresses used and to make the addresses available to the test definition. This built in feature of a constrained random test generator allows storage addresses used in the past to be accessed by the current instruction generation eliminating the requirement of deliberately establishing target addresses first. This allows separate test events to interact with the same storage addresses without having to write a special test.

20 Claims, 8 Drawing Sheets

(56) References Cited

OTHER PUBLICATIONS

A, Kamkin et al., "Reconfigurable Model-Based Test Program Generator for Microprocessors," 2011 Fourth International Conference on Software Testing, pp. 47-54, 2011.

A. Adir et al., "Genesys-Pro: Innovations in Test Program Generation for Functional Processor Verification," IEEE Design and Test of Computers, vol. 21, No. 2, pp. 84-93, Mar./Apr. 2004.

C. Krygowski et al., "Functional verification of the IBM System z10 processor chipset," IBM Journal Research and Development, vol. 53, No. 1, pp. 3:1-3:11, 2009.

U.S. Appl. No. 13/789,232, filed on the same date herewith, to Adi Dagan et al., assigned to the present assignee, and entitled "Implementing Random Content of Program Loops in Random Test Generation for Processor Verification".

* cited by examiner

MEMORY MAP EXAMPLE
200

| REAL ADDRESS 202 | DESCRIPTION OF USE 204 |
|---|---|
| 0x1000 | INST#1:LOAD MEM@0x2000 |
| 0x1004 | INST#2:STORE MEM@0x3000 |
| 0x1008 | INST#3:STORE MEM@0x3004 |
| 0x100C | INST#4:BRANCH TO MEM@0x4000 |
| 0x2000 | DATA READ BY INST#1 AT MEM@0x1000<br>DATA READ BY INST#6 AT MEM@0x4004 |
| 0x2004 | DATA READ BY INST#5 AT MEM@0x4000 |
| 0x3000 | DATA WRITTEN BY INST#2 MEM@0x1004 |
| 0x3004 | DATA WRITTEN BY INST#3 MEM@0x1008 |
| 0x4000 | INST#5:LOAD MEM@0x2004 |
| 0x4004 | INST#6:LOAD MEM@0x2000 |

EXAMPLES OF ADDRESS HISTORY AFTER GENERATING
INSTRUCTIONS #1-6

INSTRUCTION ADDRESS
HISTORY 402
(24 SEPARATE VALUES)

ALL VALUES 0x1000 – 0x100F

ALL VALUES 0x4000 – 0x4007

DATA READ ADDRESS
HISTORY 410
(8 SEPARATE VALUES)

ALL VALUES 0x2000 – 0x2007

DATA WRITE ADDRESS
HISTORY 412
(8 SEPARATE VALUES)

ALL VALUES 0x3000 – 0x3007

DATA ADDRESS HISTORY 404
(16 SEPARATE VALUES)

ALL VALUES 0x2000 – 0x2007

ALL VALUES 0x3000 – 0x3007

MOST USED DATA ADDRESS
HISTORY 414
(4 SEPARATE VALUES)

ALL VALUES 0x2000 – 0x2003

BRANCH ADDRESS HISTORY 406

1 VALUE 0x100C

BRANCH TARGET
ADDRESS HISTORY 408

1 VALUE 0x4000

FIG. 4

IMPLEMENTING AUTOMATED MEMORY ADDRESS RECORDING IN CONSTRAINED RANDOM TEST GENERATION FOR VERIFICATION OF PROCESSOR HARDWARE DESIGNS

FIELD OF THE INVENTION

The present invention relates generally to the data processing field, and more particularly, relates to method and apparatus for implementing automated memory address recording in constrained random test generation for verification of processor hardware designs.

DESCRIPTION OF THE RELATED ART

Processor pre-silicon functional verification is typically accomplished using test definitions with an automated test case generation tool, such as IBM Genesys Pro Test Program Generator which produces a sequence of assembly level instructions. These test definitions are typically produced by engineers to exercise specific architectural and micro-architectural features of the processor.

U.S. Pat. No. 6,006,028 to Aharon et al., issued Dec. 21, 1999 and assigned to the present assignee discloses an architecture-independent test program generator for producing test programs for checking the operation of a hardware processor design comprises means for storing data representing the processor instruction set and resources, and logic for generating, for subsequent storage or processing, test programs from said stored data, characterized in that the data is a separate declarative specification, the generator comprising logic for extracting said data from the storage means, and in that the relationships between the processor resources and semantic entities associated with each instruction are modeled in the declarative specification.

Current test generation technology is based on generating a single assembly instruction at a time, with virtually no information about past events. Such information about past events that is known is limited to the current state of the design being tested. Limiting knowledge of past events is partially deliberate, to make use of random and constrained random verification techniques.

For example, see "Verification of the IBM RISC System/6000 by a dynamic biased pseudo random test program generator," IBM Systems Journal V30, No. 4, pps. 527-538, 1991 and "Using a constraint satisfaction formulation and solution techniques for random test program generation, IBM systems journal V41 No. 3 pps. 386-402, 2002.

Previous approaches to writing test definitions for constrained random test generation that target storage address relationships involved the test definition deliberately establishing, for example, by specifying or capturing target addresses before using them in a complex relationship between two or more instructions. Increasing design complexity requires an exponential increase in test complexity to ensure that any two or more features of a processor design architecture or micro-architecture interact as expected and do not interfere with any other feature. Keeping up with this increased complexity in processor designs requires ever more automation in the form of constrained random test generation built into the test generation programs.

U.S. Pat. No. 7,370,296 entitled "Modeling Language and Method for Address Translation Design Mechanisms In Test Generation" issued to Koyfman et al., May 6, 2008, and assigned to the present assignee discloses methods and systems that enhance the ability of a test generator to automatically deal with address translation in a processor design, and without need for creating specific code. A model of the address translation mechanism of a design-under-test is represented as a directed acyclic graph and then converted into a constraint satisfaction problem. The problem is solved by a CSP engine, and the solution used to generate test cases for execution. Using the model, testing knowledge can be propagated to models applicable to many different designs to produce extensive coverage of address translation mechanisms.

A need exists for an efficient and effective method and apparatus for implementing automated memory address recording in constrained random test generation for verification of processor hardware designs.

SUMMARY OF THE INVENTION

Principal aspects of the present invention are to provide a method and apparatus for implementing automated memory address recording in constrained random test generation for verification of processor hardware designs. Other important aspects of the present invention are to provide such method and apparatus substantially without negative effects and that overcome many of the disadvantages of prior art arrangements.

In brief, a method and apparatus are provided for implementing automated memory address recording in constrained random test generation for verification of processor hardware designs. A test generation program includes a built in feature to keep track of storage addresses used and to make the addresses available to the test definition. This built in feature of a constrained random test generator allows storage addresses used in the past to be accessed by the current instruction generation eliminating the requirement of deliberately establishing target addresses first. This allows separate test events to interact with the same storage addresses without having to write a special test.

In accordance with features of the invention, the constrained random test generator keeps an internal record of memory addresses for instructions, branch targets and data operands that it uses as it generates instructions and maintains a record of these addresses along with various attributes.

In accordance with features of the invention, the addresses are then accessible to the test case definition through built in expression functions. Used addresses can be retrieved using several parameters. Also addresses can be grouped together by proximity in ways that are meaning full to the processor hardware micro-architecture.

In accordance with features of the invention, the addresses can be retrieved using several criteria, such as which processor used the address, an address that is most commonly used, the address that was used last or second last, and the like. The addresses include two different types, instruction addresses and data addresses.

BRIEF DESCRIPTION OF THE DRAWINGS

The present invention together with the above and other objects and advantages may best be understood from the following detailed description of the preferred embodiments of the invention illustrated in the drawings, wherein:

FIG. 2 is a memory map example for implementing automated memory address recording in constrained random test generation for verification of processor hardware designs in accordance with the preferred embodiment;

FIG. 4 illustrates examples of address history after generating instructions of FIG. 3 for implementing automated memory address recording in constrained random test generation for verification of processor hardware designs in accordance with the preferred embodiment;

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method and apparatus are provided for implementing automated memory address recording in constrained random test generation for verification of processor hardware designs.

Figure 1A:
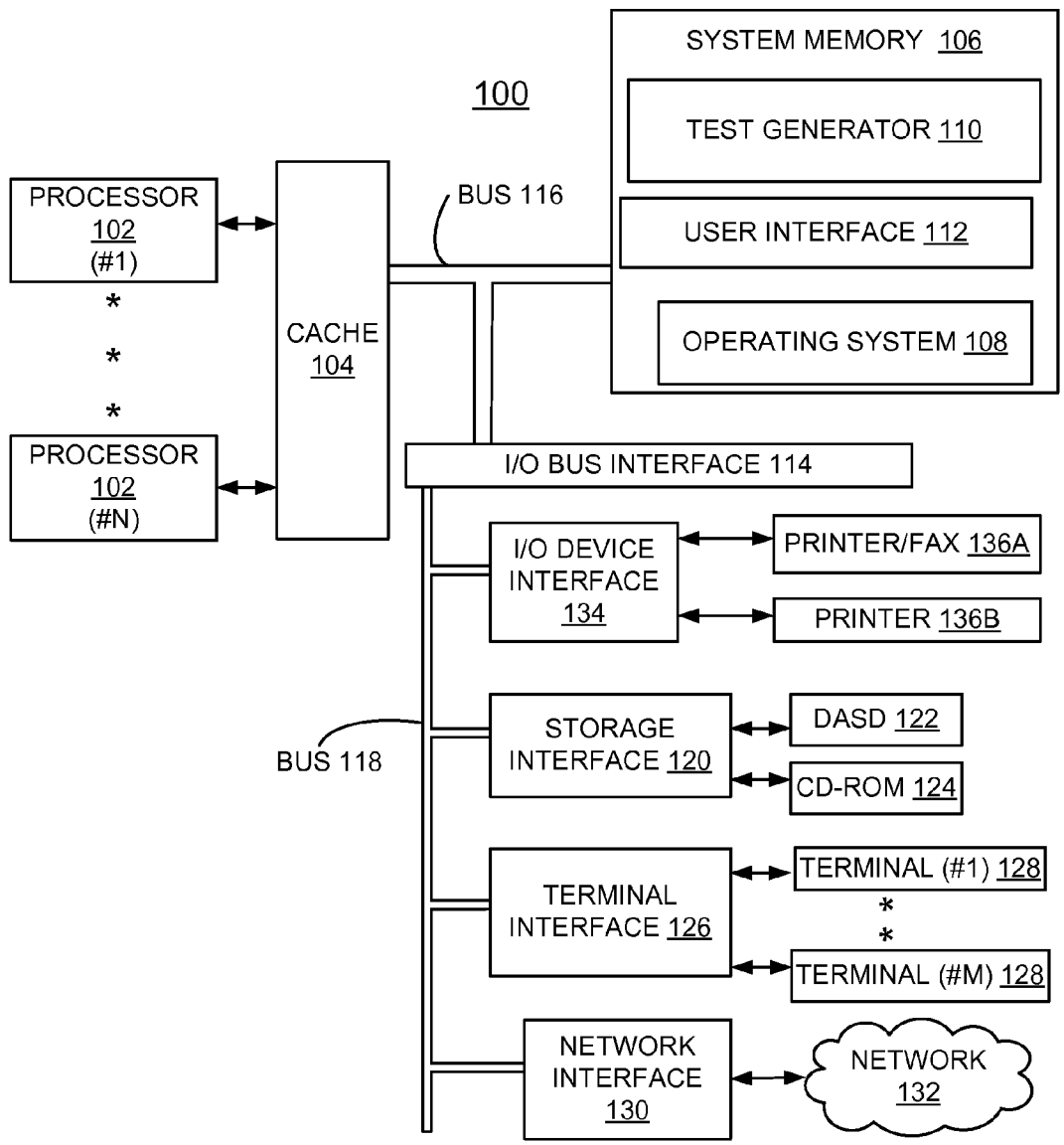
FIG. 1A is a block diagram of an example computer system for implementing automated memory address recording in constrained random test generation for verification of processor hardware designs in accordance with the preferred embodiment.
Figure 1B:
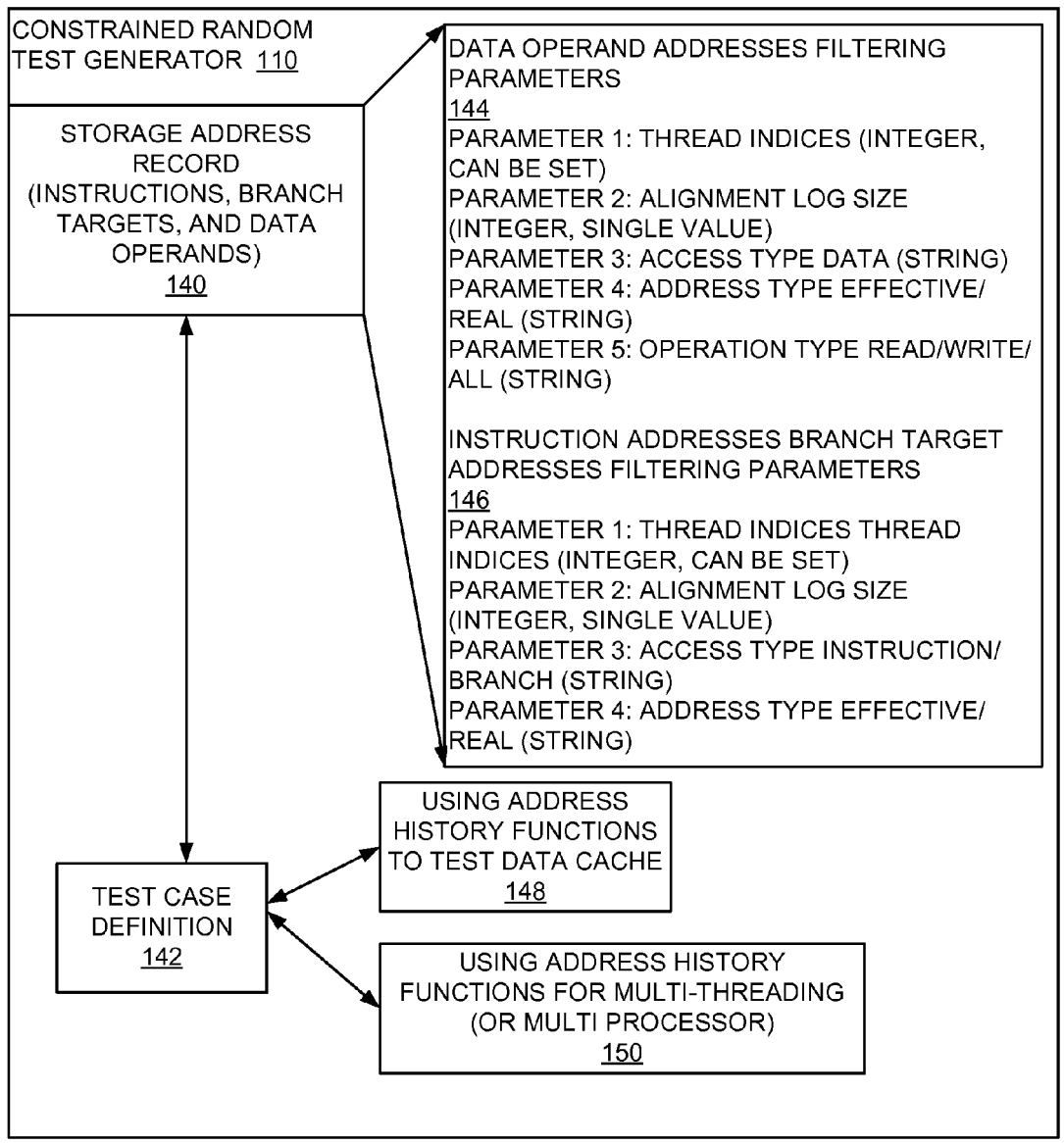
FIG. 1B is a block diagram of a test generator of the system of FIG. 1 for implementing automated memory address recording in constrained random test generation for verification of processor hardware designs in accordance with the preferred embodiment.

Having reference now to the drawings, in FIGS. 1A and 1B, there is shown a computer system embodying the present invention generally designated by the reference character 100 for implementing automated memory address recording in constrained random test generation for verification of processor hardware designs in accordance with the preferred embodiment. Computer system 100 includes one or more processors 102 or general-purpose programmable central processing units (CPUs) 102, #1-N. As shown, computer system 100 includes multiple processors 102 typical of a relatively large system; however, system 100 can include a single CPU 102. Computer system 100 includes a cache memory 104 connected to each processor 102.

Computer system 100 includes a system memory 106 an operating system 108, a test generator 110 in accordance with an embodiment of the invention and a user interface 112. System memory 106 is a random-access semiconductor memory for storing data, including programs. System memory 106 is comprised of, for example, a dynamic random access memory (DRAM), a synchronous direct random access memory (SDRAM), a current double data rate (DDRx) SDRAM, non-volatile memory, optical storage, and other storage devices.

I/O bus interface 114, and buses 116, 118 provide communication paths among the various system components. Bus 116 is a processor/memory bus, often referred to as front-side bus, providing a data communication path for transferring data among CPUs 102 and caches 104, system memory 106 and I/O bus interface unit 114. I/O bus interface 114 is further coupled to system I/O bus 118 for transferring data to and from various I/O units.

As shown, computer system 100 includes a storage interface 120 coupled to storage devices, such as, a direct access storage device (DASD) 122, and a CD-ROM 124. Computer system 100 includes a terminal interface 126 coupled to a plurality of terminals 128, #1-M, a network interface 130 coupled to a network 132, such as the Internet, local area or other networks, and a I/O device interface 134 coupled to I/O devices, such as a first printer/fax 136A, and a second printer 136B.

I/O bus interface 114 communicates with multiple I/O interface units 120, 126, 130, 134, which are also known as I/O processors (IOPs) or I/O adapters (IOAs), through system I/O bus 116. System I/O bus 116 is, for example, an industry standard PCI bus, or other appropriate bus technology.

Referring to FIG. 1B, there are shown example functions of test generation 110 in accordance with the preferred embodiment. As shown, the test generation 110 is a constrained random test generator for verification of processor hardware designs. The constrained random test generator 110 includes a storage address record 140 for keeping track of storage addresses used in constrained random test generation and making the addresses available to a test case definition 142. The storage address record 140 and test case definition 142 enable storage addresses used in the past to be accessed by the current instruction generation without having to deliberately establish target addresses first. The test case definition 142 allows separate test events to interact with the same storage addresses in storage address record 140 without having to write a special test.

Constrained random test generator 110 keeps an internal record of memory addresses for instructions, branch targets and data operands with the storage address record 140, which is used as the constrained random test generator 110 generates instructions and maintains a record of these addresses along with various attributes. These addresses stored in storage address record 140 are then accessible to the test case definition 142 through built in expression functions. Used addresses can be retrieved using several parameters. Also addresses can be grouped together by proximity in ways are meaning full to the processor hardware micro-architecture. Addresses can be retrieved using several other criteria, such as which processor used the address, an address that is most commonly used, the address that was used last or second last and the like.

The storage address record 140 stores data operand addresses with predefined filtering parameters 144 and instructions addresses and branch targets addresses with predefined parameters 146. The data operand addresses filtering parameters 144 include:

1st parameter thread indices (integer—can be a set),
2nd parameter alignment log size (integer—single value),
3rd parameter access type Data (string),
4th Parameter address type Effective/Real (string), and
5th parameter operation type Read/Write/All (string).

The predefined parameters 146 stored with instructions addresses and branch targets addresses include:
1st parameter thread indices (integer—can be a set),
2nd parameter alignment log size (integer—single value),
3rd parameter access type Instruction/Branch (string),
4th Parameter address type Effective/Real (string).

The memory addresses retrieved can be and usually are sets or even the empty set if no addresses have been used yet, or the address history has been reset. In addition to requesting a set of all past history, for example, with the 4 or 5 mentioned filters 144, we can request the most frequently used address or request addresses used recently both with the 4 or 5 filters mentioned already.

In the constrained random test generator 110 an example of using the address history functions is to test data cache as indicated in a block 148. We can query the data operand history for the most recent stored address then use the constrained random test generator 110 to generate a load type instruction using as a constraint the same real address as the prior store and all other instruction attributes being left random. We can also request a range of recent addresses, such as the last 1-5 addresses or the last 10-15 addresses.

Another example is in a multi threading (or multi processor) context 150, where random instructions have already been generated for another thread (and/or processor) and we are currently generating instructions for a different thread (and/or processor). We can request from the address history functions 150, which memory address is associated with the most frequently used cache line sized block from another thread (and/or processor). Then we can use the constrained random test generator 110 to generate a storage type instruction using the same memory range and thus create multi-thread (or multiprocessor) contention in the data cache.

Computer system 100 is shown in simplified form sufficient for understanding the present invention. It should be understood that the present invention is not limited to the illustrated arrangement of computer system 100. Test generation 110 is shown in simplified form in FIGS. 1A and 1B and should be understood that the present invention is not limited to the illustrated arrangement of test generation 110.

Example embodiments for implementing test generation 110 in accordance with the preferred embodiment including the example configurations as illustrated in FIGS. 2, 3, 4, and 5.

Referring now to FIG. 2, there is shown an example memory map generally designated by the reference character 200 for implementing automated memory address recording in constrained random test generation for verification of processor hardware designs in accordance with the preferred embodiment. The illustrated memory map 200 includes a plurality of example real addresses 202 provided together with a description of use 204 including example, load, store, branch instructions #1-6, data read by example instructions, data written by example instructions.

Figure 3:
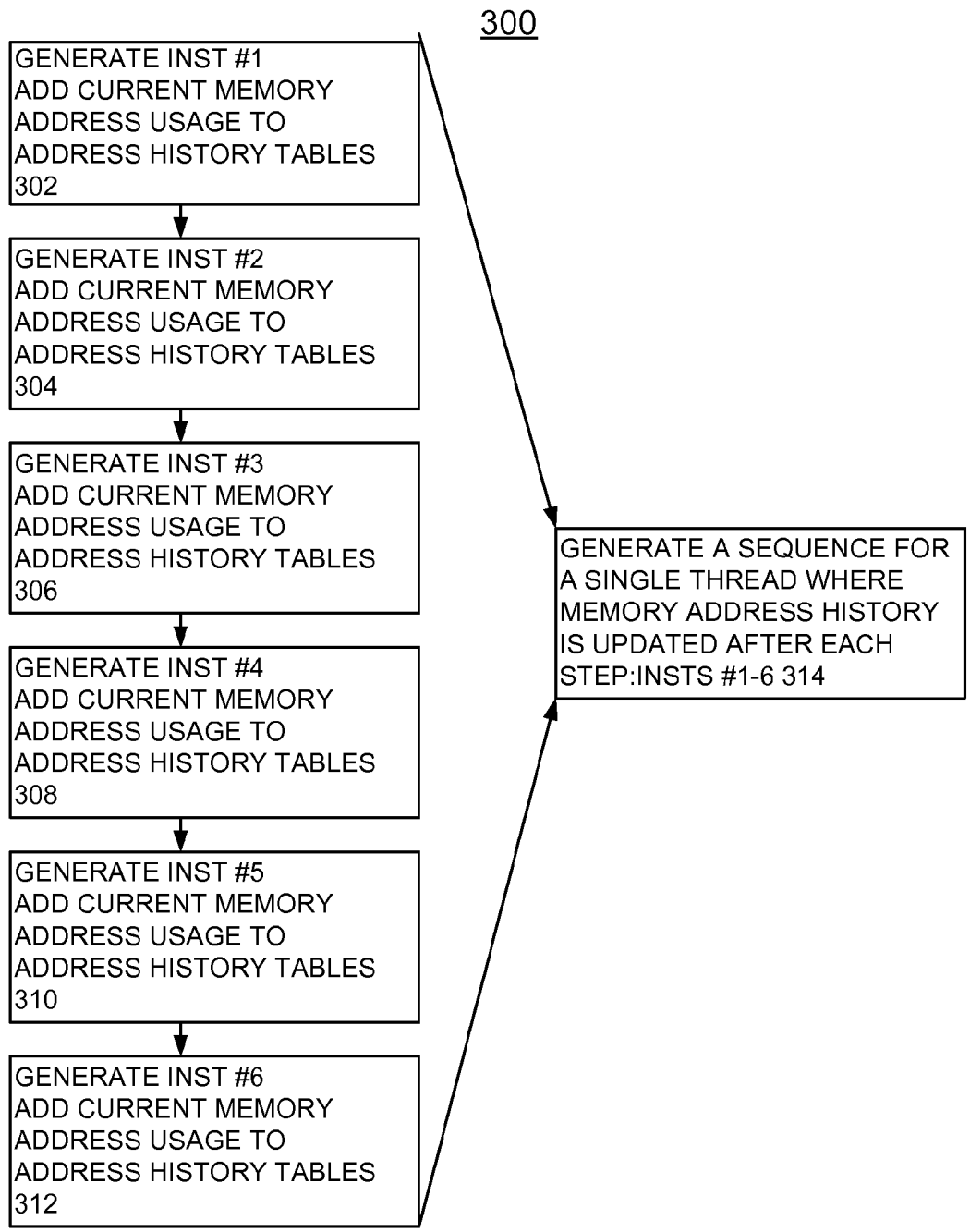
FIG. 3 is a flow chart illustrating constrained random test generator example discrete steps for implementing automated memory address recording in constrained random test generation for verification of processor hardware designs in accordance with the preferred embodiment.

Referring now to FIG. 3, there are shown constrained random test generator example discrete steps generally designated by the reference character 300 for implementing automated memory address recording in constrained random test generation for verification of processor hardware designs in accordance with the preferred embodiment. As indicated in a block 302, an instruction #1 is generated, and current memory address usage is added to the address history tables. As indicated in a block 304, an instruction #2 is generated, and current memory address usage is added to the address history tables. As indicated in a block 306, an instruction #3 is generated, and current memory address usage is added to the address history tables. As indicated in a block 308, an instruction #4 is generated, and current memory address usage is added to the address history tables. As indicated in a block 310, an instruction #5 is generated, and current memory address usage is added to the address history tables. As indicated in a block 312, an instruction #6 is generated, and current memory address usage is added to the address history tables. As indicated in a block 314, a sequence for a single thread is generated where a memory address history is updated after each step for instructions #1-6.

Referring now to FIG. 4, there are shown examples of address history generally designated by the reference character 400 after generating instructions #1-6 of FIG. 3 for implementing automated memory address recording in constrained random test generation for verification of processor hardware designs in accordance with the preferred embodiment. Address history 400 includes an instruction address history 402 including 24 separate values; a data address history 404 including 16 separate values; a branch address history 406 including 1 value; a branch target address history 408 including 1 value; a data read address history 410 including 8 separate values; a data write address history 412 including 8 separate values; and a most used data address history 414 including 4 separate values, as shown.

Figure 5:
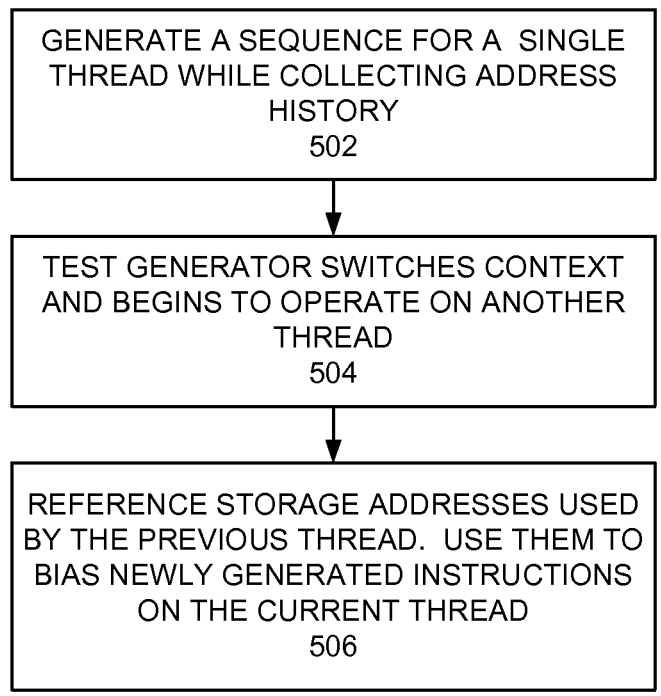
FIG. 5 is a flow chart illustrating example multi threaded use of address history collection steps for implementing automated memory address recording in constrained random test generation for verification of processor hardware designs in accordance with the preferred embodiment.

Referring now to FIG. 5, there are shown example multi threaded use address history collection steps generally designated by the reference character 500 for implementing automated memory address recording in constrained random test generation for verification of processor hardware designs in accordance with the preferred embodiment. As indicated in a block 502, a sequence for a single thread is generated while collecting address history. The test generator switches context and begins to operate on another thread as indicated in a block 504. As indicated in a block 506, storage addresses used by a previous thread are referenced and used to bias newly generated instructions on the current thread.

Figure 6:
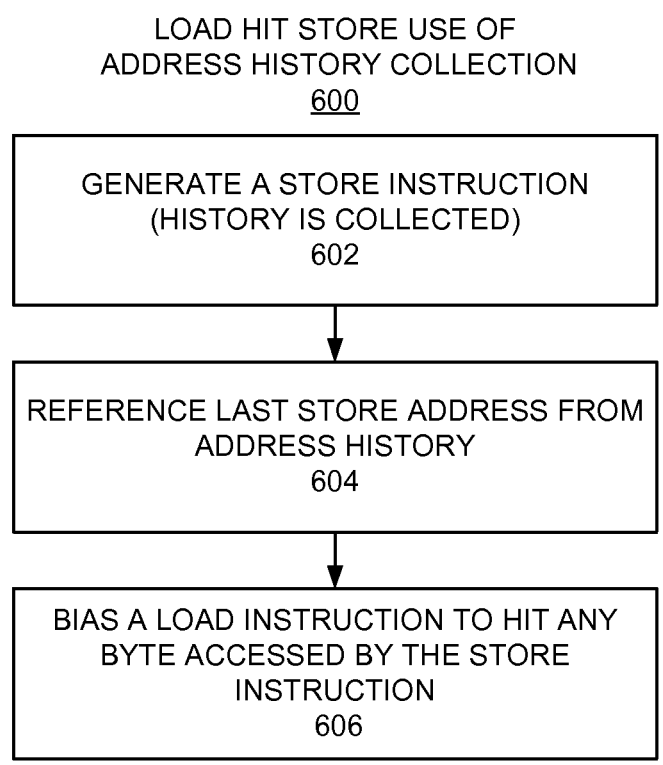
FIG. 6 is a flow chart illustrating example load hit store use of address history collection steps for implementing automated memory address recording in constrained random test generation for verification of processor hardware designs in accordance with the preferred embodiment.

Referring now to FIG. 6, there are shown example load hit store use address history collection steps generally designated by the reference character 600 for implementing automated memory address recording in constrained random test generation for verification of processor hardware designs in accordance with the preferred embodiment. As indicated in a block 602, a store instruction is generated and address history is collected. As indicated in a block 604, last store address from the address history is referenced. Then as indicated in a block 606, a load instruction is biased to hit any byte accessed by the store instruction.

Figure 7:
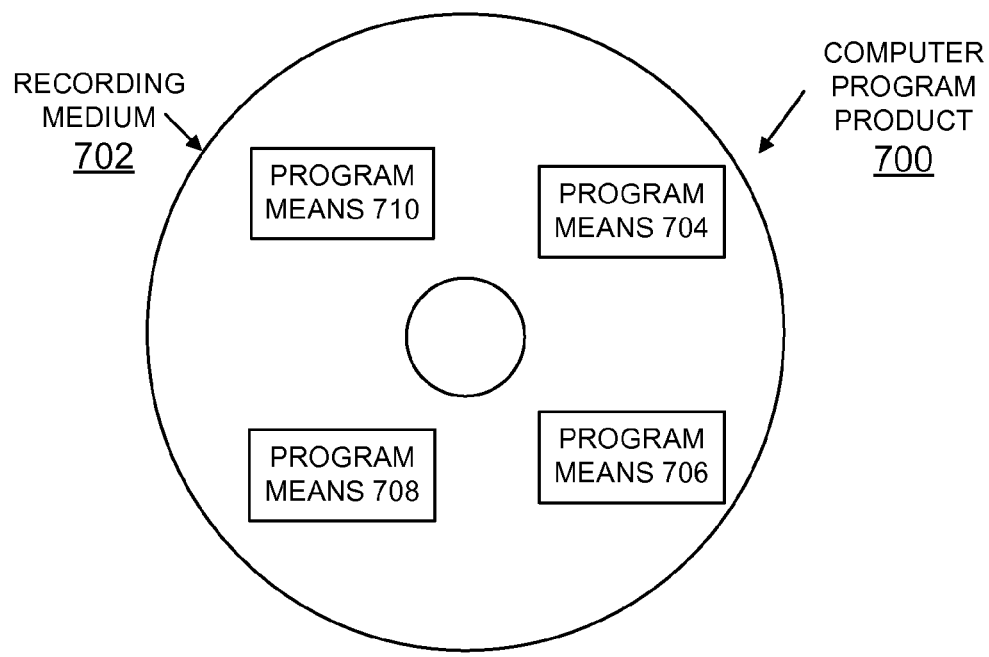
FIG. 7 is a block diagram illustrating a computer program product in accordance with the preferred embodiment.

Referring now to FIG. 7, an article of manufacture or a computer program product 700 of the invention is illustrated. The computer program product 700 is tangibly embodied on a non-transitory computer readable storage medium that includes a recording medium 702, such as, a floppy disk, a high capacity read only memory in the form of an optically read compact disk or CD-ROM, a tape, or another similar computer program product. Recording medium 702 stores program means 704, 706, 708, and 710 on the medium 702 for carrying out the methods for implementing automated memory address recording in constrained random test generation for verification of processor hardware designs of the preferred embodiment in the system 100 of FIGS. 1A, and 1B.

A sequence of program instructions or a logical assembly of one or more interrelated modules defined by the recorded program means 704, 706, 708, and 710, direct the system 100 for implementing automated memory address recording in constrained random test generation of the preferred embodiment.

While the present invention has been described with reference to the details of the embodiments of the invention shown in the drawing, these details are not intended to limit the scope of the invention as claimed in the appended claims.

What is claimed is:

1. An apparatus for implementing automated memory address recording in constrained random test generation for verification of processor hardware designs comprising:
   a processor,
   a constrained random test generator tangibly embodied in a non-transitory machine readable medium used in the processor hardware design verification process;
   said processor using said constrained random test generator, maintaining an internal storage address record of storage addresses used in a constrained random test generation and making storage addresses in said internal storage address record available to a test case definition, and accessing storage addresses in said internal storage address record for current instruction generation.

2. The apparatus as recited in claim 1 wherein said processor using said constrained random test generator, maintaining said internal storage address record of storage addresses includes generating an instruction and adding a current memory address usage to said internal storage address record.

3. The apparatus as recited in claim 2 further includes generating a sequence for a single thread where memory address history is updated after each instruction generation step.

4. The apparatus as recited in claim 1 wherein said processor using said constrained random test generator, maintaining said internal storage address record of storage addresses includes maintaining an instruction address history in said internal storage address record.

5. The apparatus as recited in claim 4 further includes maintaining a branch target address history in said internal storage address record.

6. The apparatus as recited in claim 4 further includes maintaining predefined values with instruction addresses in said instruction address history, said predefined values including at least one of a thread indices, an alignment log size, an access type Instruction/Branch, and an address type Effective or Real.

7. The apparatus as recited in claim 1 wherein said processor using said constrained random test generator, maintaining said internal storage address record of storage addresses includes maintaining a data operand address history in said internal storage address record.

8. The apparatus as recited in claim 7 further includes maintaining predefined values with data operand addresses in said data operand address history, said predefined values including at least one of a thread indices value, an alignment log size, an access type Data, an address type Effective/Real, and an operation type Read, Write, or All.

9. The apparatus as recited in claim 1 wherein said processor using said constrained random test generator, accessing storage addresses used in the past for current instruction generation includes enabling separate test events to interact with the same storage addresses without writing a special test.

10. The apparatus as recited in claim 1 wherein said processor using said constrained random test generator includes generating instructions for at least one thread using address history functions in said internal storage address record.

11. The apparatus as recited in claim 1 wherein said processor using said constrained random test generator includes using address history functions in said internal storage address record to test data cache.

12. A method for implementing automated memory address recording in constrained random test generation for verification of processor hardware designs comprising:
    providing a processor,
    providing a constrained random test generator tangibly embodied in a non-transitory machine readable medium used in the processor hardware design verification process; said processor using said constrained random test generator comprising the steps of:
    maintaining an internal storage address record in said constrained random test generator of storage addresses used in a constrained random test generation;
    making storage addresses in said internal storage address record available to a test case definition, and
    accessing storage addresses in said internal storage address record for current instruction generation.

13. The method as recited in claim 12 wherein maintaining said internal storage address record of storage addresses includes generating an instruction and adding a current memory address usage to said internal storage address record.

14. The method as recited in claim 13 further includes generating a sequence for a single thread where memory address history is updated after each instruction generation step.

15. The method as recited in claim 12 wherein maintaining said internal storage address record of storage addresses includes maintaining an instruction address history in said internal storage address record.

16. The method as recited in claim 15 wherein maintaining said internal storage address record of storage addresses includes maintaining a branch target address history in said internal storage address record.

17. The method as recited in claim 12 wherein maintaining said internal storage address record of storage addresses includes maintaining a data operand address history in said internal storage address record.

18. The method as recited in claim 12 wherein maintaining said internal storage address record of storage addresses includes maintaining a data operand address history in said internal storage address record and maintaining an instruction address history in said internal storage address record.

19. The method as recited in claim 18 includes maintaining predefined values with instruction addresses in said instruction address history, said predefined values including at least one of a thread indices, an alignment log size, an access type Instruction/Branch, and an address type Effective or Real.

20. The method as recited in claim 18 includes maintaining predefined values with data operand addresses in said instruction address history, said predefined values including at least one of a thread indices value, an alignment log size, an access type Data, an address type Effective/Real, and an operation type Read, Write, or All.

* * * * *